No. 713,019. Patented Nov. 4, 1902.
T. F. SOLON.
LIQUID VENDING MACHINE.
(Application filed Apr. 14, 1902.)
(No Model.) 3 Sheets—Sheet 1.

No. 713,019. Patented Nov. 4, 1902.
T. F. SOLON.
LIQUID VENDING MACHINE.
(Application filed Apr. 14, 1902.)
(No Model.) 3 Sheets—Sheet 3.

Witnesses
T. F. Solon, Inventor
by Attorneys

UNITED STATES PATENT OFFICE.

THOMAS F. SOLON, OF WEST SUPERIOR, WISCONSIN, ASSIGNOR TO KATE SOLON, OF DOUGLAS COUNTY, WISCONSIN.

LIQUID-VENDING MACHINE.

SPECIFICATION forming part of Letters Patent No. 713,019, dated November 4, 1902.

Application filed April 14, 1902. Serial No. 102,910. (No model.)

*To all whom it may concern:*

Be it known that I, THOMAS F. SOLON, a citizen of the United States, residing at West Superior, in the county of Douglas and State of Wisconsin, have invented a new and useful Liquid-Vending Machine, of which the following is a specification.

The invention relates to improvements in liquid-vending machines.

The object of the present invention is to improve the construction of vending-machines, more especially the means for dispensing liquids, and to provide a simple and comparatively inexpensive machine of this character designed, primarily, for dispensing liquids from original packages and capable of delivering a predetermined quantity at each operation of it.

The invention consists in the construction and novel combination and arrangement of parts hereinafter fully described, illustrated in the accompanying drawings, and pointed out in the claims hereto appended.

Figure 1:
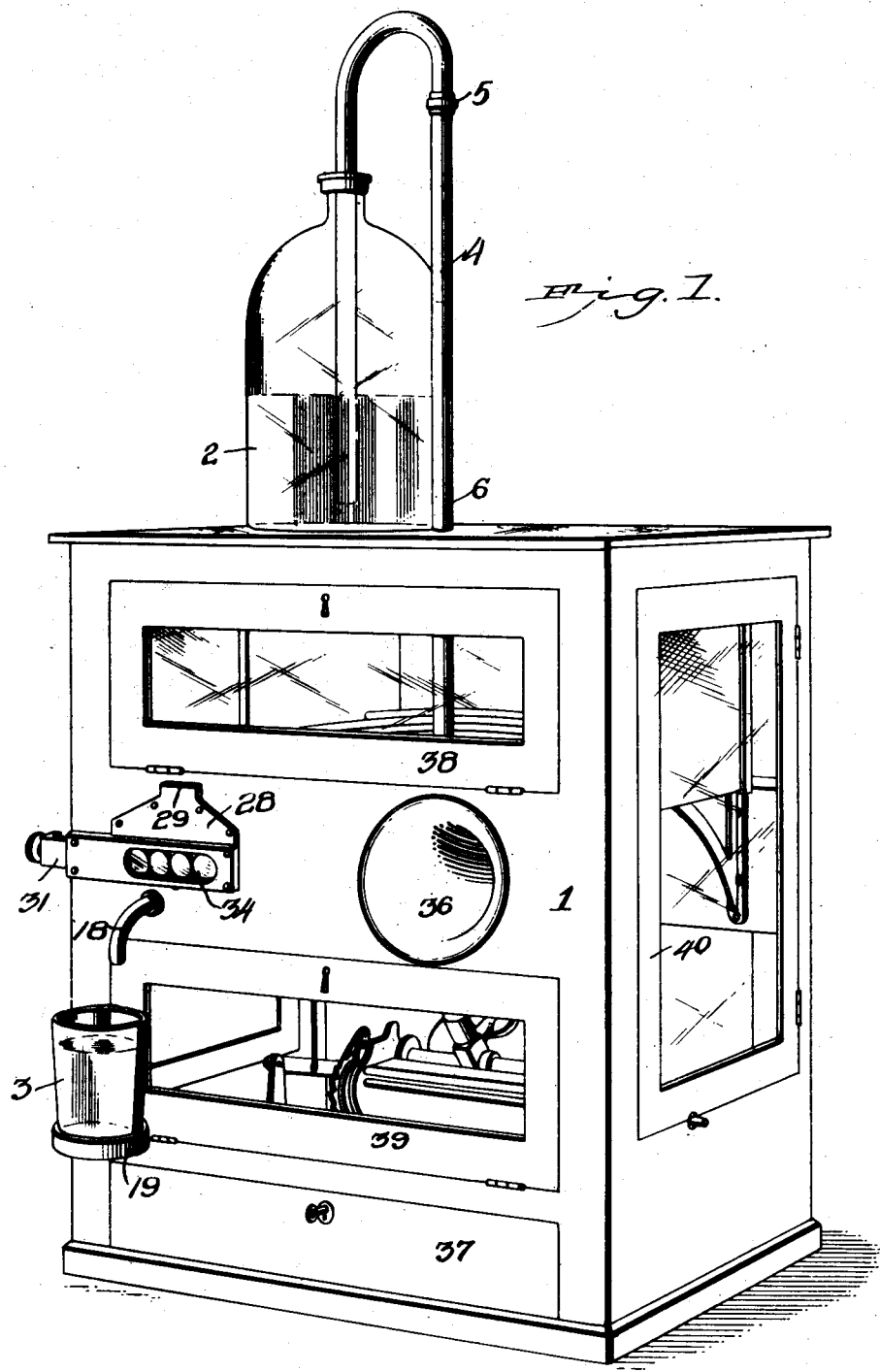
Figure 2:
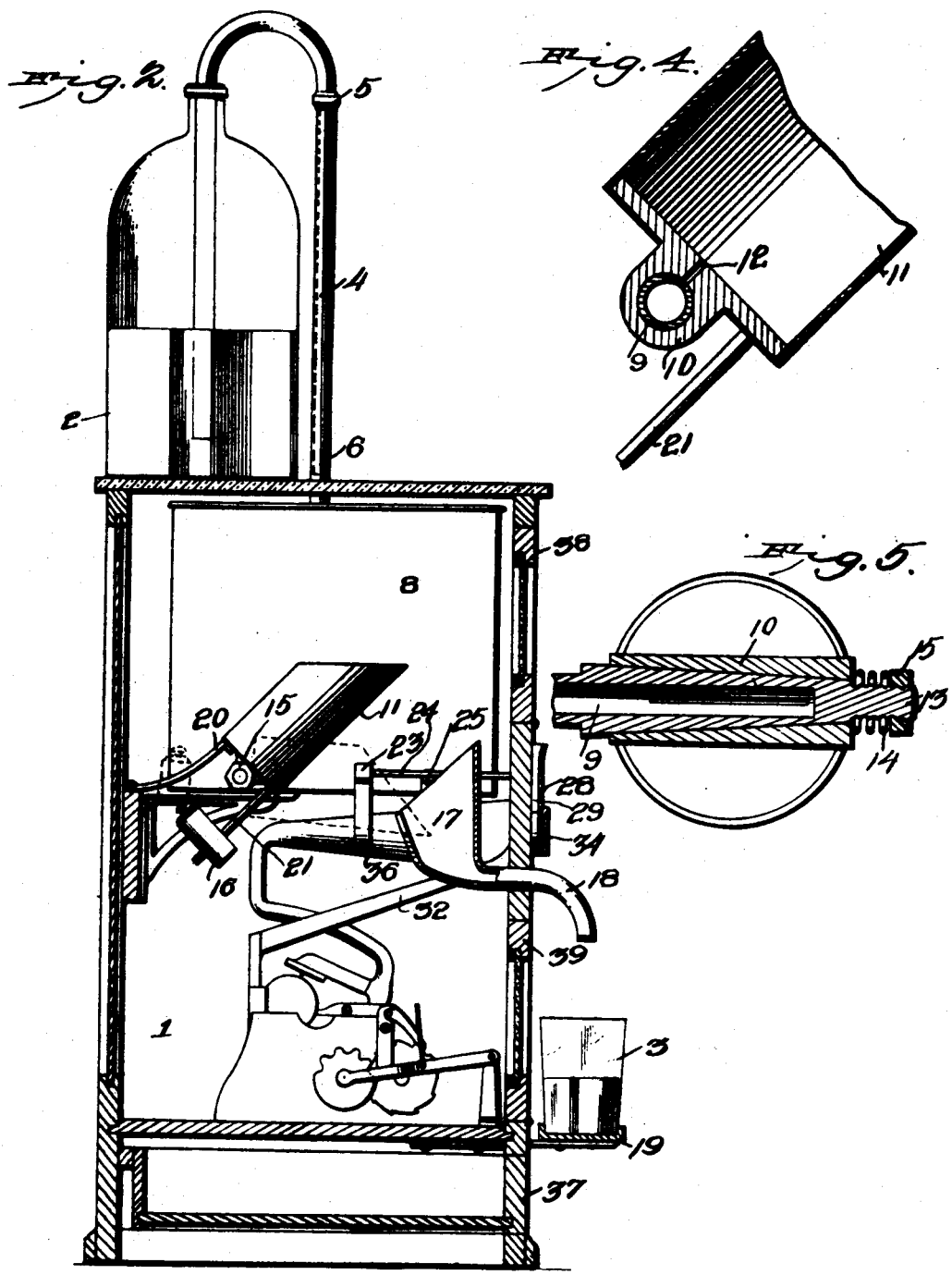
Figure 3:
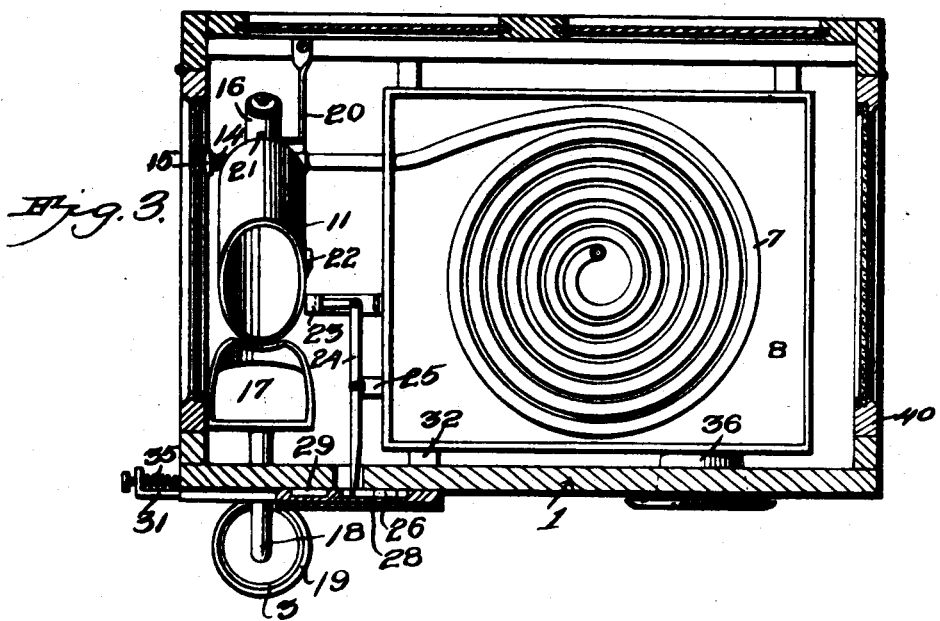
Figure 6:
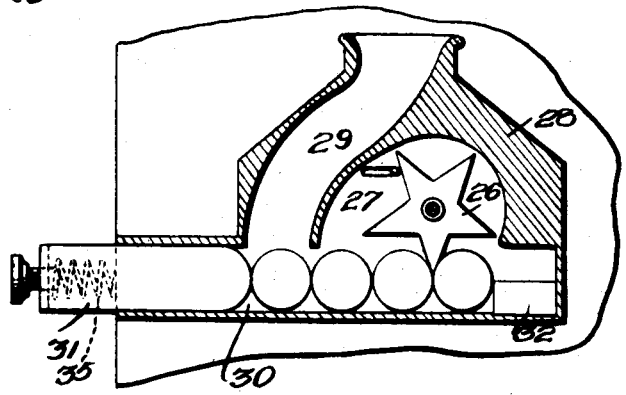

In the drawings, Figure 1 is a perspective view of a liquid-vending machine constructed in accordance with this invention. Fig. 2 is a vertical sectional view of the same. Fig. 3 is a horizontal sectional view. Figs. 4 and 5 are detail views illustrating the construction of the automatic valve of the oscillatory dispensing-cup. Fig. 6 is a detail view of the coin-slot and the coin-actuated star-wheel.

Like numerals of reference designate corresponding parts in all the figures of the drawings.

1 designates a casing or cabinet, preferably of rectangular form, as illustrated in Fig. 1 of the accompanying drawings, and designed to be provided at its sides and ends with transparent plates or panes to enable its interior to be readily inspected in order to enable a purchaser to see the liquid from the time it leaves an original package or receptacle 2 until it is discharged into a drinking-glass 3 in order that the purchaser may be assured that he is obtaining the beverage or other liquid for which he is paying. The original package or receptacle is designed to be placed on the exterior of the machine, at the top thereof, as it is received from the manufacturer or bottler, and the liquid is drawn from the receptacle 2 by means of a siphon 4, one leg of which extends into the receptacle 2, as clearly indicated in Figs. 1 and 2 of the drawings. The siphon 4 has its long leg 5 telescoping into a section or member 6 to enable it to be readily moved vertically, whereby it is adapted to be applied to and removed from the receptacle 2. The siphon may have any number of branches or legs for extending into original packages or receptacles to enable a number of the same to be simultaneously displayed and also to provide the desired supply. The siphon is preferably constructed of glass or other transparent material; but, if desired, any form of siphon-tube may be used, and the member 6 of the siphon extends into the casing of the machine through the top thereof and is connected with a cooling-coil 7, located within a suitable ice-chamber 8, located at the top of the casing. The ice may be supported in any suitable manner and the coil 7 may be of transparent or other material, and its outer end is connected with an automatic valve consisting of a slotted tube 9 of tapered form, arranged in a socket 10, of an oscillatory liquid-dispensing cup 11, provided in its bottom with a slot 12, extending into the socket 10 and adapted, when the receptacle or cup 11 is oscillated, as hereinafter described, to be carried into and out of register with the slot of the tube 9, whereby the flow of the liquid will be permitted and will be shut off, as hereinafter explained. The socket of the drinking or liquid-dispensing cup 11 preferably consists of a transverse tube, which is slightly tapered to fit the tube 9, and the latter is provided with an extended threaded terminal 13, receiving the coiled spring 14, which is interposed between the adjacent end of the socket 10 and the nut 15, arranged on the threaded end of the tube and adapted to regulate the tension of the spring to secure the desired frictional engagement of the socket with the tube to control the oscillation of the cup 11.

The dispensing-cup 11 is arranged in an inclined position, with its mouth at the top when the automatic valve is open, and it is retained in such position by a scale-weight 16 until the weight of the liquid within the cup counterbalances and becomes slightly in excess of the scale-weight. This will cause the cup to oscillate from the position illustrated in full lines in Fig. 2 of the drawings to that shown in dotted lines. This brings the cup to an inclined position slightly below a horizontal position to cause its contents to be discharged into a funnel-shaped mouth 17 of a discharge-tube 18, extending through the front of the casing and having its outer end curved downward and arranged over a bracket or support 19, which is adapted to receive the drinking-glass 3 and which may be provided with a suitable waste-pipe for conducting any liquid emptied from the glass to a suitable receptacle to prevent the floor or other supporting-surface at the front of the machine from becoming wet by water emptied from the glass 3. The rearward or upward swing of the dispensing-cup is limited by a suitable stop 20, consisting of an arm extending from the back of the casing, and the scale-weight 16 is mounted on an arm 21 of the cup, and is adjustably secured to and adapted to slide along the same. By adjusting the scale-weight 16 along the arm the desired weight of liquid may be dispensed at each operation of the machine. The dispensing-cup is provided at one side with a beveled lug 22, forming an upper shoulder and adapted to be engaged by a resilient catch 23, having a beveled engaging head, forming a lower shoulder and adapted when the dispensing-cup is swung downward to a discharging position to automatically engage the lug and hold the cup in such position with the automatic valve closed. The resilient catch, which may be of any desired construction, is connected with one arm of a lever 24, fulcrumed between its ends on a suitable bracket or support 25 and having its other end arranged to be engaged by a star-wheel 26. The star-wheel 26, which is adapted to be partially rotated by a coin of the proper denomination, as hereinafter explained, is arranged to oscillate the lever 24 and withdraw the resilient catch from engagement with the lug of the cup to permit the latter to be swung upward by the scale-weight. As soon as the cup is swung upward the valve is opened and the liquid is caused to flow into the said cup, which will be operated as heretofore described. The star-wheel, which may be connected by any suitable means with a register, is mounted in a suitable recess 27 of a plate 28, secured to the front of the casing and provided with an upright coin-slot 29 and having a horizontal way 30, at the outer end of which is arranged a push-bar 31 and at the inner end of which is arranged a coin-chute 32, extending to a coin-controlled phonograph or graphophone or other form of talking-machine. The plate 28 is provided at the horizontal way 30 with a transparent plate or pane 34 for exposing to view a number of the coins. The push-bar is normally held extended by a suitable spring 35, and it is adapted to be forced inward to move the coins against the depending point of the star-wheel to partially rotate the latter. Any form of register may be connected with the shaft of the star-wheel. The horn 36 of the talking-machine has its mouth mounted in a suitable opening of the casing, as clearly shown in Fig. 1, and the talking-machine may be provided with any suitable advertising or other matter for inducing persons to purchase the liquid.

The casing is provided at the bottom with a suitable cash-drawer 37, and it has upper and lower doors 38 and 39 at its front and the door 40 at one end, and these doors are preferably provided with plates or panes of glass or other transparent material, as shown. The ice-chamber is designed to be provided with a suitable waste-pipe for enabling the water resulting from the melting of ice to drain off from the casing.

It will be seen that the coin-controlled vending-machine is simple and comparatively inexpensive in construction, that it is adapted to dispense liquids from original packages, and that it will render the liquid visible from the time it leaves the original package until it is discharged from the machine, so that a purchaser may know that he is receiving the liquid for which he is paying. It will also be apparent that the machine is capable of cooling the liquid and that it is adapted to simultaneously operate a talking-machine to enable the virtues, characteristics, and advantages of the liquid to be described while the liquid is being consumed by purchasers.

What I claim is—

1. A machine of the class described comprising a casing, a siphon designed to be connected with an original package or receptacle, a movable dispensing-receptacle connected with the siphon, and a valve operated by the movable dispensing-receptacle for controlling the flow of a liquid, substantially as described.

2. A machine of the class described comprising a casing, an exteriorly-arranged siphon designed to be connected with an original package or receptacle and extending into the casing, a movable dispensing-receptacle connected with the siphon, and a valve for controlling the flow of the liquid, substantially as described.

3. A machine of the class described comprising a siphon designed to be connected with an original package, a movable dispensing-receptacle connected with the siphon, and a valve operated by the movable receptacle for controlling the flow of a liquid, substantially as described.

4. A machine of the class described comprising a casing, a siphon, a slotted valve-tube connected with the siphon, and an oscillatory dispensing-receptacle provided with an aperture arranged to be carried into and out of register with the slot of the valve-tube by the oscillation of the receptacle, substantially as described.

5. A machine of the class described comprising a casing, a siphon designed to be connected with an original package and located on the exterior of the casing and having a removable leg or portion, a tube or pipe extending from the siphon and adapted to be arranged in a cooling-chamber, a movable receptacle connected with the pipe or tube, and a valve operated by the movable receptacle for controlling the flow of a liquid, substantially as described.

6. In a machine of the class described, the combination of a tube designed to be connected by a suitable source of supply and provided with a slot, an oscillatory receptacle provided with an aperture adapted to be carried into and out of register with the slot, a weight connected with the receptacle and adapted to swing the same in one direction, said receptacle being adapted to be swung in the opposite direction by the weight of a liquid, means for locking the receptacle with its aperture out of register with the slot, and means for releasing the receptacle, substantially as described.

7. In a machine of the class described, the combination of a tube designed to be connected with a suitable source of supply and having a slot, an oscillating receptacle mounted on the tube and having an aperture adapted to be carried into and out of register with the slot, and means for oscillating the receptacle, substantially as described.

8. In a machine of the class described, the combination of a tapered tube having a slot and designed to be connected with a suitable source of supply, an oscillating receptacle having a socket receiving the tube and provided with an aperture communicating with the receptacle and adapted to register with the slot, and means for oscillating the receptacle, substantially as described.

9. In a machine of the class described, the combination of a tapered tube having a slot and designed to be connected with a suitable source of supply, an oscillating receptacle having a tapered socket receiving the tube and provided with an aperture communicating with the receptacle and adapted to register with the slotted tube, a spring connected with the tube and the socket, and means for adjusting the spring, substantially as described.

10. In a machine of the class described, the combination of a casing, a tube arranged within the casing and designed to be connected with a suitable source of supply, an oscillating receptacle connected with the tube and provided with a weight for swinging it in one direction, an automatic valve for controlling the flow of the liquid, said valve being opened when the receptacle is actuated by its weight, and the said receptacle being adapted to be oscillated in the opposite direction by the weight of the liquid, a locking device arranged to engage the receptacle, and means for releasing the locking device, substantially as described.

11. In a machine of the class described, the combination of a casing, an oscillating receptacle provided with a weight adapted to swing it in one direction, a tube connected with the receptacle and designed to be connected with a suitable source of supply, a valve operated by the movement of the receptacle, a locking device arranged to engage the receptacle to hold the same in a position for discharging its contents, a lever connected with the locking device, and means for operating the lever, substantially as described.

12. In a machine of the class described, the combination of a casing having a cooling-chamber, an exterior siphon designed to be connected with an original package or receptacle, a cooling-tube arranged within the cooling-chamber and connected with the siphon, a movable dispensing-cup connected with the tube, a valve operated by the movement of the cup for controlling the flow of a liquid, a locking device for holding the receptacle, means for releasing the receptacle, and an automatically-operated talking-machine arranged within the casing, substantially as described.

In testimony that I claim the foregoing as my own I have hereto affixed my signature in the presence of two witnesses.

THOMAS F. SOLON.

Witnesses:
CARRIE LINDLEY,
R. I. TIPTON.